United States Patent
Zhang

(10) Patent No.: US 11,966,795 B2
(45) Date of Patent: Apr. 23, 2024

(54) METHOD AND DEVICE FOR LOADING MINUS-ONE SCREEN, TERMINAL, AND COMPUTER READABLE STORAGE MEDIUM

(71) Applicant: ZTE CORPORATION, Guangdong (CN)

(72) Inventor: Nan Zhang, Guangdong (CN)

(73) Assignee: ZTE CORPORATION, Guangdong (CN)

(*) Notice: Subject to any disclaimer, the term of this patent is extended or adjusted under 35 U.S.C. 154(b) by 641 days.

(21) Appl. No.: 17/261,169

(22) PCT Filed: Jul. 31, 2019

(86) PCT No.: PCT/CN2019/098638
§ 371 (c)(1),
(2) Date: Jan. 18, 2021

(87) PCT Pub. No.: WO2020/024989
PCT Pub. Date: Feb. 6, 2020

(65) Prior Publication Data
US 2021/0279083 A1 Sep. 9, 2021

(30) Foreign Application Priority Data
Jul. 31, 2018 (CN) .......................... 201810856248.6

(51) Int. Cl.
*G06F 9/455* (2018.01)
*G06F 9/445* (2018.01)
*G06F 9/54* (2006.01)

(52) U.S. Cl.
CPC .......... *G06F 9/542* (2013.01); *G06F 9/44505* (2013.01); *G06F 9/45537* (2013.01);
(Continued)

(58) Field of Classification Search
CPC .. G06F 9/542; G06F 9/44505; G06F 9/45537; G06F 9/45558; G06F 9/541; G06F 2009/45566; G06F 2009/45583
See application file for complete search history.

(56) References Cited

U.S. PATENT DOCUMENTS 9,678,773 B1 6/2017 Wagner et al.
2017/0038955 A1* 2/2017 Zhao ..................... G06F 3/0481
(Continued)

FOREIGN PATENT DOCUMENTS

| CN | 106557319 A | 4/2017 |
| CN | 107193441 A | 9/2017 |
| CN | 107315531 A | 11/2017 |

OTHER PUBLICATIONS

ZTE Corporation, International Search Report, PCT/CN2019/098638, dated Oct. 29, 2019, 4 pages with translation (2 pages).

*Primary Examiner* — Tammy E Lee
(74) *Attorney, Agent, or Firm* — NZ CARR LAW OFFICE

(57) ABSTRACT

Embodiments of the present disclosure provide a method for loading a minus-one screen, comprising: loading a code of the minus-one screen and a resource of the minus-one screen to a virtual machine respectively, the code of the minus-one screen being independent from a code of a desktop container; creating a context of the minus-one screen and replacing a context of the desktop container, the context of the minus-one screen including a resource acquisition path of the resource of the minus-one screen; and loading the minus-one screen according to the context of the minus-one screen.

13 Claims, 8 Drawing Sheets

(52) U.S. Cl.
CPC .......... *G06F 9/45558* (2013.01); *G06F 9/541* (2013.01); *G06F 2009/45566* (2013.01); *G06F 2009/45583* (2013.01)

(56) References Cited

U.S. PATENT DOCUMENTS

2017/0105041 A1* 4/2017 Hu .................... H04N 21/6582
2017/0315681 A1* 11/2017 Kang ................. G06F 16/9535
2018/0213001 A1* 7/2018 Zamir .................... H04L 63/10

* cited by examiner

METHOD AND DEVICE FOR LOADING MINUS-ONE SCREEN, TERMINAL, AND COMPUTER READABLE STORAGE MEDIUM

CROSS REFERENCE TO RELATED APPLICATIONS

The present application is a United States National Stage Application filed under 35 U.S.C. § 371 of PCT Patent Application Serial No. PCT/CN2019/098638, filed Jul. 31, 2019, which claims the benefit of priority to Chinese Patent Application No. 201810856248.6 filed Jul. 31, 2018, each of which is incorporated by reference herein in its entirety.

TECHNICAL FIELD

The present disclosure relates to the field of terminal technologies, and more particularly, to a method and a device for loading a minus-one screen, a terminal, and a computer readable storage medium.

BACKGROUND

As an entrance of all applications in a mobile phone of a user, a mobile phone desktop is one of the most basic, important and frequently used applications in some mobile phone systems. As a "facade" of an operating system, many mobile phone manufacturers have designed unique mobile phone desktops thereof according to their own product styles, striving to provide users with simpler and more practical functions, more beautiful interfaces and more convenient services.

However, a Launcher (desktop launcher) desktop displays all applications in a form of a square pattern, which is very simple in a display manner, and cannot provide the users with other richer and more diverse services. Based on this, Google put forward a concept of "minus-one screen", which was to add a screen to a leftmost end of an original desktop screen. Since "0" is used as a serial number in an original first screen in code implementation, a serial number of a screen added to a left of the first screen is "−1", so that the screen is called the minus-one screen. The minus-one screen has special advantages thereof such as easy access, rich content styles that can be presented, more convenient operations provided for the users, accessibility to a third-party service to achieve software revenues, or the like. Therefore, many mobile phone manufacturers and operating system desktops in the market will develop minus-one screens thereof, which are constantly and continuously optimized and improved so as to provide the users with convenient and practical functions.

However, a code of the minus-one screen and a code of a Launcher desktop container are mixed together at present, and service logics of the minus-one screen and the Launcher desktop container are also coupled together, so that the minus-one screen and the desktop container have a high version maintenance cost, which is very unfavorable for respective version alternations of the minus-one screen and the desktop container.

SUMMARY

A method and a device for loading a minus-one screen, a terminal, and a computer readable storage medium provided by the present disclosure mainly solves some technical problems that: a code of a minus-one screen and a code of a desktop container are mixed, and a service logic coupling degree is high, which is not conducive to version alternations of the minus-one screen and the desktop container.

Some embodiments of the present disclosure provide a method for loading a minus-one screen, including:
loading a code of the minus-one screen and a resource of the minus-one screen to a virtual machine respectively, the code of the minus-one screen being independent from a code of a desktop container;
creating a context of the minus-one screen and replacing a context of the desktop container, the context of the minus-one screen including a resource acquisition path of the resource of the minus-one screen; and
loading the minus-one screen according to the context of the minus-one screen.

Some embodiments of the present disclosure further provide a device for loading a minus-one screen, including:
a code resource loading module configured to respectively load a code of the minus-one screen and a resource of the minus-one screen to a virtual machine, the code of the minus-one screen being independent from a code of a desktop container;
a runtime environment creating module configured to create a context of the minus-one screen and replace a context of the desktop container, the context of the minus-one screen including a resource acquisition path of the resource of the minus-one screen; and
a minus-one screen loading module configured to load the minus-one screen according to the context of the minus-one screen.

Some embodiments of the present disclosure further provide a terminal, including a processor, a memory, and a communication bus, wherein:
the communication bus is configured to realize communication between the processor and the memory; and
the processor is configured to execute one or more programs stored in the memory to implement the steps of the method for loading a minus-one screen as above.

Some embodiments of the present disclosure further provide a computer readable medium, wherein the computer readable storage medium stores one or more programs, and the one or more programs are executable by one or more processors to implement the steps of the method for loading a minus-one screen as above.

DETAILED DESCRIPTION

First Embodiment

Figure 1:
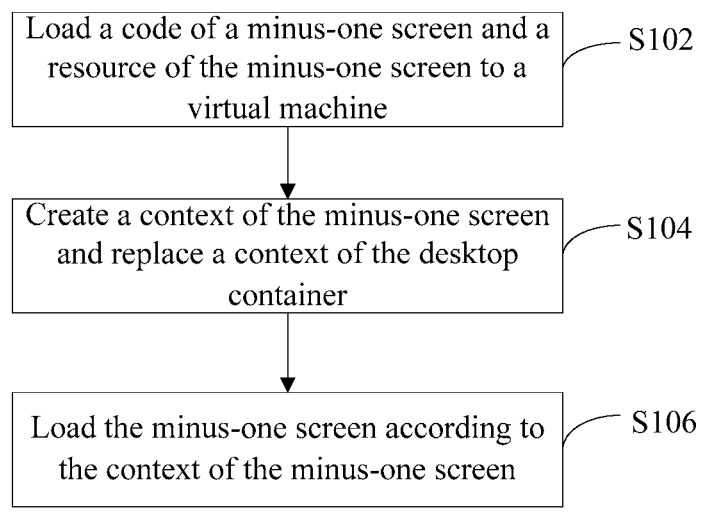
FIG. 1 is a flow chart of a method for loading a minus-one screen provided by a first embodiment of the present disclosure.

In order to solve the problem that a service logic of a minus-one screen is coupled with a service logic of a desktop container due to the mixing of a code of the minus-one screen and a code of the desktop container, which is unable to upgrade the minus-one screen separately, resulting in a high version maintenance cost of the minus-one screen, this embodiment provides a method for loading a minus-one screen. Please refer to a flow chart of the method for loading a minus-one screen illustrated in FIG. 1, the method for loading a minus-one screen provided by this embodiment includes the following steps.

In step S102, a code of a minus-one screen and a resource of the minus-one screen are loaded to a virtual machine respectively.

In this embodiment, the code of the minus-one screen and the code of the desktop container are independent and are not mixed together. The desktop container has its own installation package, such as Apk (AndroidPackage), and similarly, the minus-one screen also has its own independent installation package. In this embodiment, the minus-one screen needs to be loaded to the desktop container, so that a user may normally enter the minus-one screen when touching on a first screen, and the minus-one screen with the independent code can provide business services to the user just like the minus-one screen in the existing art. Here, the minus-one screen may be regarded as a plugin of the desktop container, and the plug-in minus-one screen will eventually run in the desktop container. Taking a Launcher desktop as an example, a structure of the Launcher desktop is briefly introduced. Please refer to FIG. 2 and FIG. 3.

Figure 2:
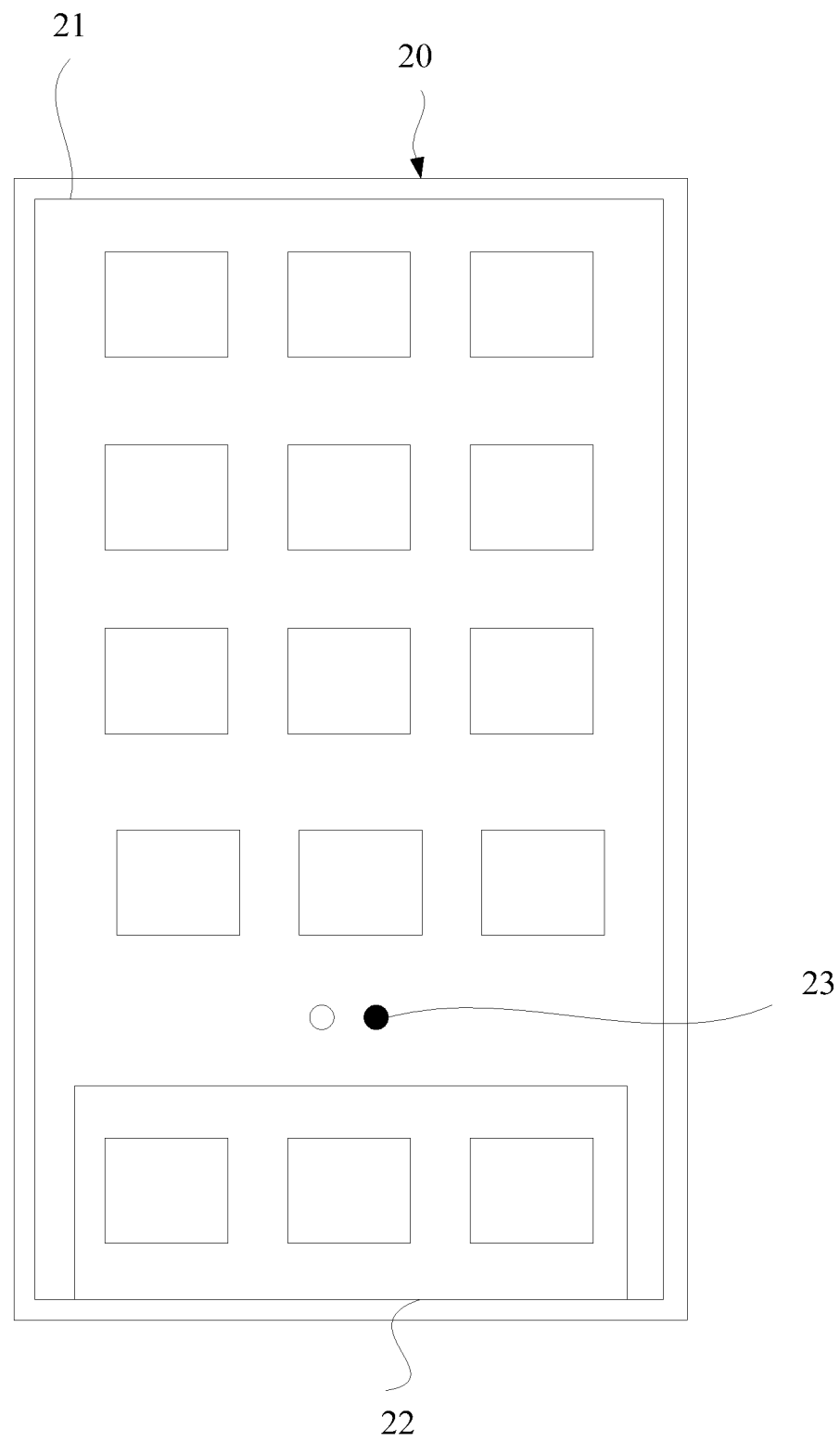
FIG. 2 is a schematic structural diagram of a common screen provided by the first embodiment of the present disclosure.

After the minus-one screen is introduced, the Launcher desktop is divided into the minus-one screen and a common screen. It may be understood that there may be more than one common screen. FIG. 2 illustrates a schematic structural diagram of a common screen 20. The common screen 20 includes a workspace 21, a hotseat 22 and a navigation point 23. The workspace 21 is a component that can slide left and right. In the normal screen 20, the workspace 21 is a container for application icons, and the application icons may be dragged inside the workspace 21. The navigation point 23 is configured to indicate which common screen is currently on. The hotseat 22 is configured to store some commonly used application icons. In the case of two or more common screens, when a user controls the workspace 21 to slide left and right, the hotseat 22 in the common screen 20 will not move along with the movement of the workspace 21.

Figure 3:
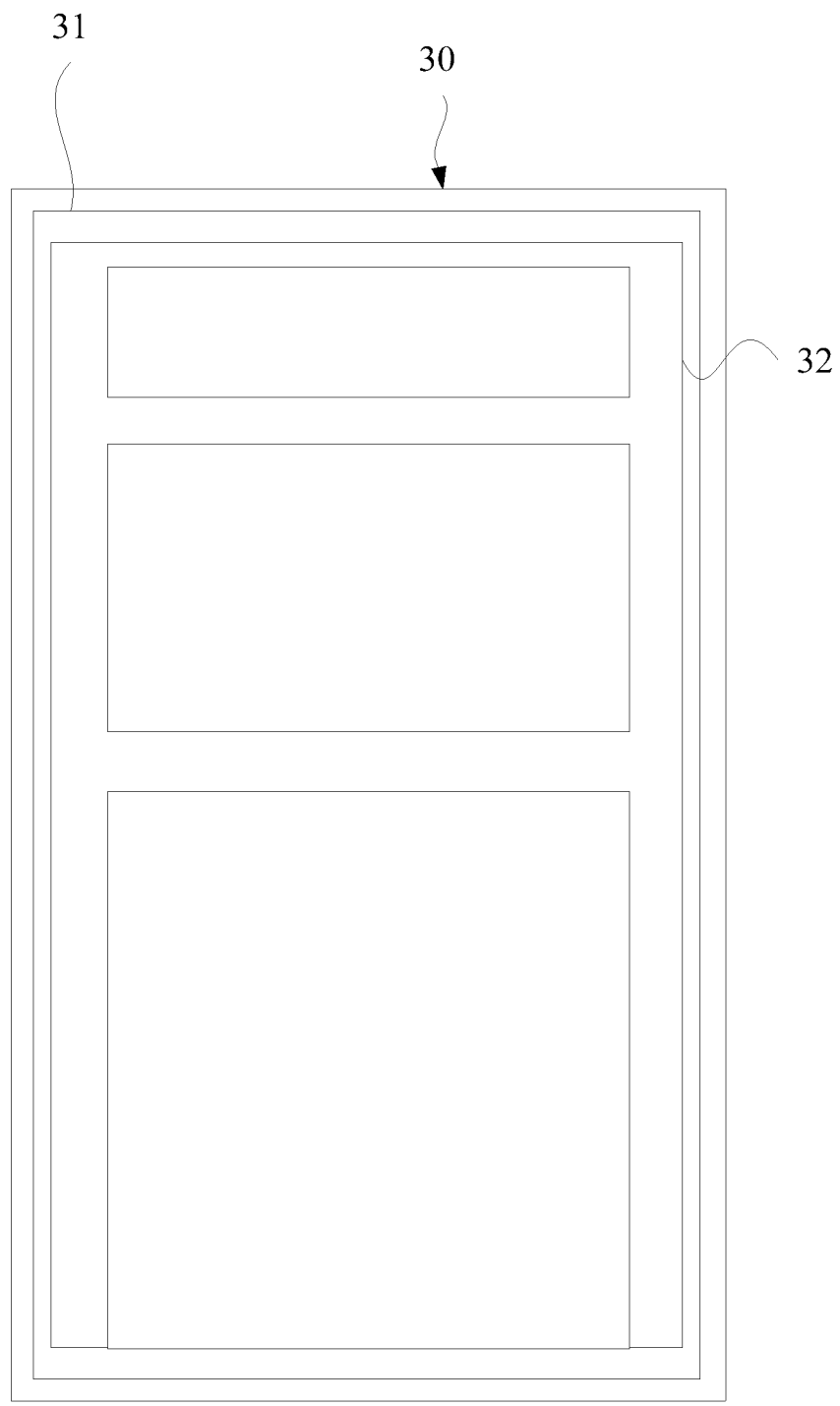
FIG. 3 is a schematic structural diagram of a minus-one screen provided by the first embodiment of the present disclosure.

FIG. 3 illustrates a schematic structural diagram of a minus-one screen 30. The minus-one screen 30 includes a desktop container 31, and a root layout 32 of the minus-one screen. The root layout 32 of the minus-one screen runs in the desktop container 31. Display layout of the minus-one screen 30 is no longer limited by a display layout style of the common screen 20. For example, the minus-one screen 30 can support sliding up and down, and the minus-one screen 30 can present more contents to the user in comparison to display contents of the common screen 20. Moreover, the contents displayed on the minus-one screen 30 are not limited to a plurality of application icons. For example, the minus-one screen 30 may access third-party services to implement software revenues.

In order to load the minus-one screen, a code in a plugin installation package, i.e., the code of the minus-one screen, needs to be loaded to the virtual machine. It may be understood that loading the code of the minus-one screen to the virtual machine is actually loading a class file in the code of the minus-one screen to a Java virtual machine. In a compiling system of Android, the class file is further processed, which makes the class file become a dex file. The dex file is an executable file on an Android platform, which is equivalent to an exe file in a Windows platform. Every Apk installation package contains a dex file, which contains all source codes of the installation package. Therefore, loading the code in the plugin installation package is essentially loading the dex file in the plugin installation package.

A ClassLoader may be used when loading the class, and a DexClassLoader may be used for loading the dex file. The DexClassLoader is a class inherited from the ClassLoader. Therefore, in this embodiment, a terminal may use the DexClassLoader to load the dex file of the minus-one screen, for example, the DexClassLoader loads the dex file from the installation package of the minus-one screen.

After the DexClassLoader loads the dex file of the minus-one screen to the virtual machine, it actually loads the class corresponding to the minus-one screen to the virtual machine. In this case, the virtual machine of the terminal may load a root layout of the minus-one screen by a reflection loading manner. The virtual machine finds a method to load the root layout of the minus-one screen from the loaded class, and then loads the root layout of the minus-one screen according to the method.

After loading the code of the minus-one screen to the virtual machine, it is also necessary to load the resource of the minus-one screen to the virtual machine. The resource of the minus-one screen includes words, pictures, entries, or the like. In the Android system, a getResource method may be used to acquire a corresponding resource object, and a plurality of parameters required for creating the resource object need to be imported through an asset manager. Therefore, in this embodiment, in order to load the resource of the minus-one screen, the terminal may construct the asset manager first, and then construct the resource object through the asset manager, and then load the resource of the minus-one screen to the virtual machine according to the resource object.

In step S104, a context of the minus-one screen is created, and a context of the desktop container is replaced.

The terminal may load the code and the resource of the minus-one screen to the virtual machine in S102. However, when the DexClassLoader loads the dex file in the Apk of the minus-one screen to a process of the desktop container, the context of the desktop container is imported when the root layout of the minus-one screen is loaded by reflection. Therefore, in this case, the code of the minus-one screen running in the process of the desktop container is actually in a runtime environment of the desktop container. The minus-one screen can only obtain a resource of the desktop container when acquiring resources. The plurality of resources (such as pictures, layouts and entries, etc.) of the minus-one screen itself cannot be found in the resource of the desktop container.

Therefore, in order to ensure that the resource of the minus-one screen itself may be acquired when the minus-one screen is running, in this embodiment, after the terminal loads the resource of the minus-one screen to the virtual machine, it is also necessary to process the context representing the runtime environment of the minus-one screen: the terminal creates a context belonging to the minus-one screen, such as a terminal-defined MContext; and the Mcontext inherits from a context wrapper. As the context of the minus-one screen, the Mcontext includes a resource acquisition path of the resource of the minus-one screen.

In step S106, the minus-one screen is loaded according to the context of the minus-one screen.

After the terminal creates the context of the minus-one screen, the minus-one screen may be loaded according to the context. It may be understood that loading the minus-one screen according to the context of the minus-one screen actually means running the code of the minus-one screen according to the context of the minus-one screen, and referencing the resource of the minus-one screen during a code running process to present the minus-one screen to the user. In other words, the virtual machine runs the code of the minus-one screen in the runtime environment corresponding to the context of the minus-one screen, and refers the resource of the minus-one screen to provide a minus-one screen service to the user. In this way, the minus-one screen runs in the runtime environment belonging to the minus-one screen, and may acquire the its own resource, instead of running in the runtime environment of the desktop container, which can only acquire the resource of the desktop container.

Through the above process, the minus-one screen can be loaded. However, because the minus-one screen and the desktop container belong to different processes, and cannot communicate directly with each other, which makes the desktop container unable to notify the minus-one screen of events such as the user sliding into and sliding out of the minus-one screen. It may be understood that if the minus-one screen knows when the user slides in, the minus-one screen may update contents when the user slides in, so as to provide the latest and most real-time business service to the user. Besides, if the minus-one screen knows when the user slides out, the minus-one screen may release a memory in time and end some specific monitoring, thus avoiding resource occupation and waste. Therefore, if the minus-one screen cannot communicate with the desktop container, the minus-one screen may only update the content and release resources regularly, and cannot provide the user with high-quality business services, which will easily lead to low user experience. Therefore, in order to let the minus-one screen know the events of the user sliding in and sliding out, this embodiment provides a communication method as below.

The terminal may invoke a dispatch key event in an event distribution mechanism of a View (user interface) to realize the communication between the desktop container and the minus-one screen: when the desktop container monitors an event for the minus-one screen, the desktop container may invoke the dispatch key event to distribute the event to the minus-one screen. It may be understood that the dispatch key event is not only configured to distribute events to the minus-one screen, but also to distribute events belonging to a common screen (also called events of system) to the desktop container. Therefore, when the dispatch key event distributes an event, it is necessary to distinguish whether the event to be distributed currently belongs to the common screen or belongs to the minus-one screen.

In this embodiment, the terminal may distinguish whether the current event to be distributed belongs to the minus-one screen or the system through event attribute information. The event attribute information includes an event action and an information code. The action includes a key press event, a key pop-up event and the like. The code is configured to indicate which key the event is for. In order to distinguish the event of the minus-one screen from the event of the system, a parent view in the desktop container ensures that the event attribute information of the two is different before distributing the event. In this way, when the dispatch key event distributes the event, the dispatch key event can determine whether the current event belongs to the minus-one screen according to the event attribute information. It may be understood that as long as one of the event attribute information of the event of the minus-one screen is different from the event attribute information of the event of the system, the purpose of distinguishing can be achieved. In some examples of this embodiment, the action and the code of the event of the minus-one screen may be made different from actions and codes of a plurality of events of the system.

Since the event action and the information code of the event of the system are usually positive or non-negative numbers, in some examples of this embodiment, in order to make it easy to distinguish, at least one information in the event attribute information of the event of the minus-one screen may be set as a negative number. Therefore, when the dispatch key event determines that the event attribute information of the event to be distributed currently includes a negative number, it can be directly determined that the event is the event of the minus-one screen. For instance, in an example of this embodiment, the action and the code of the event of the minus-one screen are both negative numbers, while the action and the code of the event of the system are both positive numbers.

In this embodiment, the code of the minus-one screen runs in the process of the desktop container, so it is impossible to read and write data directly from a private data area of the minus-one screen. In some related solutions, for this case, an AIDL (Android Interface Definition Language) and a service are used to complete inter-process communication, but these solutions have the following defects.

1) During the running of the minus-one screen, it is necessary to continuously keep the service alive. In other words, when the minus-one screen needs to read and write data with the help of the service, it is necessary to determine whether the service is in a running status first, and if it is determined that the service is in the running status, the data may be read normally; otherwise, the service has to be started before data reading and writing. That is to say, this data reading and writing demand cannot be responded normally.

2) When loading the root layout of the minus-one screen, data stored in the private data area of the minus-one screen may be needed. If the service is not started when loading the root layout of the minus-one screen, the minus-one screen cannot be loaded. In this case, the loading process of the minus-one screen will be interrupted, which will lead to a longer loading time of the minus-one screen.

3) Because the solution of reading and writing the data from the private data area of the minus-one screen is based on the service and the AIDL, when there is a data reading and writing demand, it is necessary to extend a corresponding interface for the AIDL, and this interface also needs to be implemented for the service. In this way, if a third-party Android archive (aar) package wants to read data, it also needs to provide an interface for the aar package by callback, which will make a complicated logic and a high coupling degree.

In order to avoid the plurality of problems above, this embodiment also provides another solution for reading and writing data in the private data area of the minus-one screen:

The terminal uses a content provider to wrap and form a first SharedPreferences interface, and uses the first SharedPreferences interface to replace the SharedPreferences interface in the context (i.e., the context of the desktop container) imported by reflection when loading the root layout of the minus-one screen. In other words, the context of the minus-one screen Mcontext may also include the first SharedPreferences interface. For the minus-one screen, the minus-one screen may have two SharedPreferences interfaces, one of which is the first SharedPreferences interface wrapped by the Content Provider, the other is a real SharedPreferences interface, which is called a second SharedPreferences interface here. After the loading of the minus-one screen is completed, data reading and writing in the private data area of the minus-one screen may be implemented through the first SharedPreferences interface and the second SharedPreferences interface of the minus-one screen.

Figure 4:
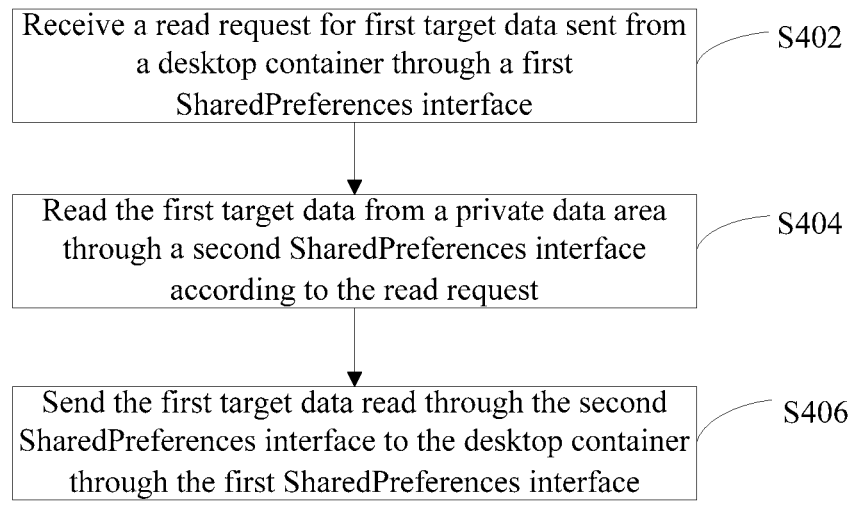
FIG. 4 is a flow chart of reading data in a private data area of the minus-one screen provided in the first embodiment of the present disclosure.

First, the process of reading the data from the private data area of the minus-one screen is briefly introduced, as shown in FIG. 4.

In step S402, a read request for first target data sent from the desktop container is received through the first SharedPreferences interface.

When the desktop container has a requirement to read data from the private data area of the minus-one screen, the read request for the first target data may be sent to the minus-one screen through the first SharedPreferences interface. It may be understood that the read request may include information configured to indicate the first target data to be read.

In step S404, the first target data is read from the private data area through the second SharedPreferences interface according to the read request.

After receiving the read request from the desktop container through the first SharedPreferences interface, the minus-one screen may use the second SharedPreferences interface to read the first target data from the private data area according to the read request.

In step S406, the first target data read by the second SharedPreferences interface is sent to the desktop container through the first SharedPreferences interface.

After the second SharedPreferences interface reads the first target data from the private data area of the minus-one screen, the read first target data may be sent to the desktop container through the first SharedPreferences interface.

Figure 5:
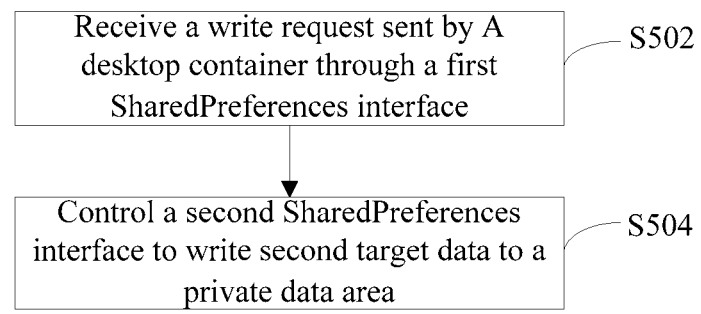
FIG. 5 is a flow chart of writing data in the private data area of the minus-one screen provided in the first embodiment of the present disclosure.

The following describes the process of writing the data to the private data area of the minus-one screen with reference to a data writing process shown in FIG. 5.

In step S502, a write request sent from the desktop container is received through the first SharedPreferences interface.

When the desktop container needs to write second target data to the private data area of the minus-one screen, the desktop container may send a write request to the minus-one screen through the first SharedPreferences interface, and the write request at least includes the second target data to be written.

In S504, the second SharedPreferences interface is controlled to write the second target data to the private data area.

After the minus-one screen receives the write request sent from the desktop container through the first SharedPreferences interface, the write request may be parsed to obtain the second target data, and then the minus-one screen writes the second target data to the private data area through the second SharedPreferences interface.

From the data reading process in FIG. 4 and the data writing process shown in FIG. 5, it may be seen that the first SharedPreferences interface is equivalent to a bridge of inter-process communication between the desktop container and the minus-one screen, while the second SharedPreferences interface mainly implements communication between the minus-one screen and the private data area. For a third party, the third party may directly call the first SharedPreferences interface to read and write the data in the private data area of the minus-one screen, and may not perceive that there is inter-process communication between the desktop container and the minus-one screen; therefore, coupling with the third party is decreased.

In the method for loading a minus-one screen provided in this embodiment, under the condition of separating the code of the minus-one screen from the code of the desktop container, the code of the minus-one screen and the resource of the minus-one screen are loaded to the virtual machine to create the context of the minus-one screen pointing to the resource of the minus-one screen, and replace the context of the desktop container with the context of the minus-one screen, so that the minus-one screen can run in its own the runtime environment and refer its own resource. Therefore, in the case of reducing the coupling between the minus-one screen and the desktop container, the loading of the minus-one screen in the process of the desktop container is implemented. Furthermore, through the dispatch key event in the event distribution mechanism of the view, the minus-one screen may be notified of events such as the user sliding into and sliding out of the minus-one screen, so that the minus-one screen can provide better services to the user. Besides, through mutual cooperation between the first SharedPreferences interface and the second SharedPreferences interface, the third party can read and write the data to the private data area of the minus-one screen without perceiving the inter-process communication, thus avoiding a plurality of problems caused by reading and writing the data with the aid of the AIDL and the service.

In addition, because the code of the minus-one screen is independent from the code of the desktop container, a default permission required by the minus-one screen will no longer belong to a default permission required by the desktop container, which makes it easier for the minus-one screen to pass a test of Google when the minus-one screen requires the default permission.

Second Embodiment

Figure 6:
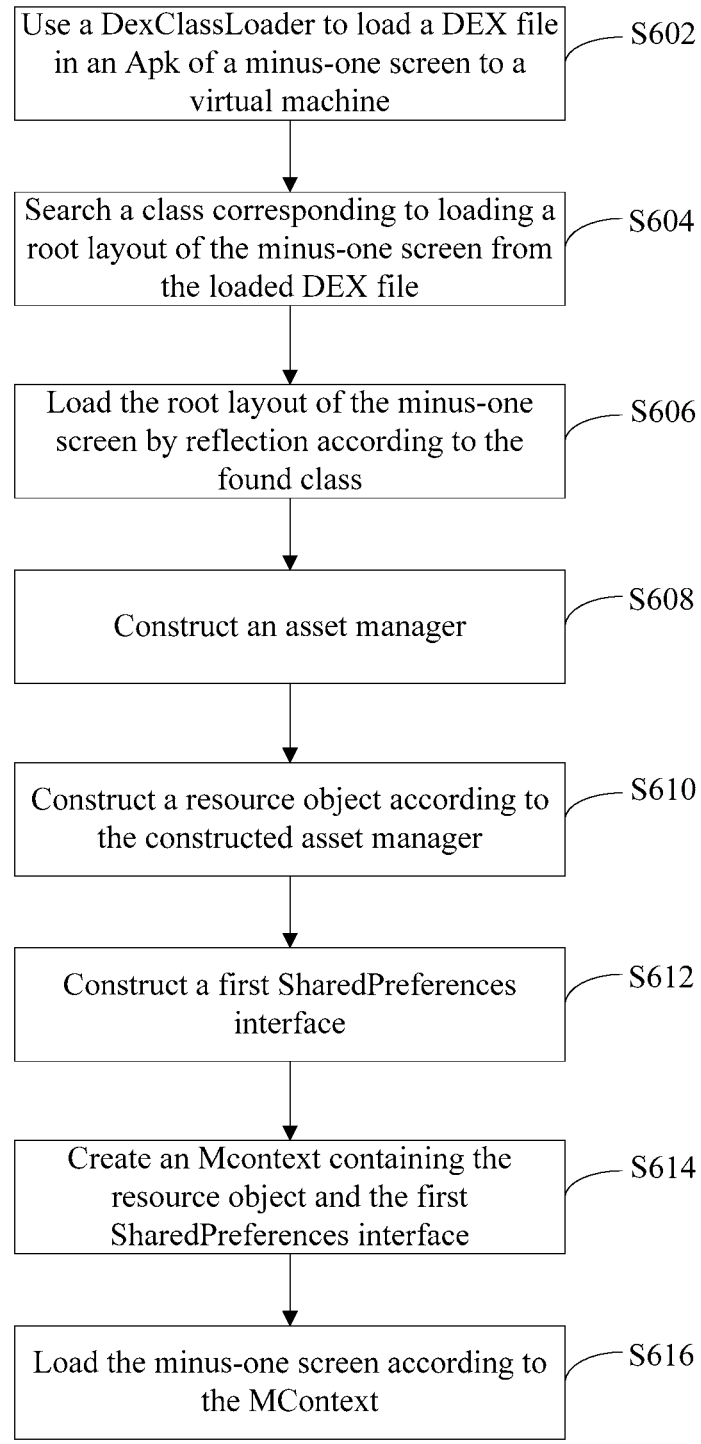
FIG. 6 is a flow chart of a method for loading a minus-one screen provided by a second embodiment of the present disclosure.

This embodiment continues to introduce the method for loading a minus-one screen based on the first embodiment. Please refer to FIG. 6, the method for loading a minus-one screen provided by this embodiment includes the following steps.

In step S602, the DexClassLoader (corresponding to a DexClassLoader in FIG. 6) is used to load the dex (corresponding to DEX in FIG. 6) file in the Apk of the minus-one screen to the virtual machine.

The DexClassLoader may use a following constructor function to load the dex file corresponding to the minus-one screen:

DexClassLoader (String dexPath, String optimizedDirectory, String libraryPath, ClassLoader parent);

the dexPath is a decompressed Apk path, which cannot be null usually; the optimizedDirectory is a storage path of the decompressed dex file, which cannot be null usually, and it is recommended to use a private path of an application for this path; the libraryPath is a path stored in a so (shared object) library; and the parent is a parent loader, which is generally the ClassLoader of context-.getClassLoader ( ) using the current context.

In this embodiment, the DexClassLoader loads the dex file from the Apk of the minus-one screen to the virtual machine, but in fact, the DexClassLoader can not only load the class in the form of dex file from the Apk, but also can load the class from a jar (Java Archive) file.

In S604, a class corresponding to loading the root layout of the minus-one screen is searched from the loaded dex file.

As the dex file in the Apk of the minus-one screen includes a plurality of classes of the minus-one screen, after the terminal loads the plurality of classes corresponding to the minus-one screen to the virtual machine by the DexClassLoader, the class corresponding to loading the root layout of the minus-one screen can be found from these classes, and this class can represent a method for loading the root layout of the minus-one screen.

In step S606, the root layout of the minus-one screen is loaded by reflection according to the found class.

Finding the class corresponding to loading the root layout of the minus-one screen is equivalent to finding the method for loading the root layout of the minus-one screen, so the terminal may load the root layout of the minus-one screen according to the found class. A specific method is:

ClassLoader.loadClass(String  name).getMethod(String name, Class<?> . . . parameterTypes).invoke(Object obj, Object . . . args).

In step S608, an asset manager is constructed.

After loading the code of the minus-one screen, i.e., the dex file of the minus-one screen, to the virtual machine, the terminal needs to load the resource of the minus-one screen to the virtual machine. In order to load the resource of the minus-one screen, the terminal needs to construct the asset manager first. Here is an example of constructing the asset manager:

Asset manager asset manager=Asset manager.class-.newInstanceo;

Method addAssetPath=asset manager.getClasso.getDeclaredMethod("addAssetPath",String.class);

addAssetPath.invoke(asset manager, path).

In S610, a resource object is constructed according to the constructed asset manager.

After creating the asset manager, the terminal may construct the resource object according to the constructed asset manager, and a constructor function may refer to the following:

Resources(Asset manager assets, DisplayMetrics metrics, Configuration config).

In step S612, a first SharedPreferences interface is constructed.

To implement inter-process communication between a Launcher desktop container and the minus-one screen, and facilitate the Launcher desktop container to read and write data to the private data area of the minus-one screen, in this embodiment, the terminal also needs to construct the first SharedPreferences interface, and when the terminal is constructing the first SharedPreferences interface, a content provider may be used to wrap the first SharedPreferences interface. In an example of this embodiment, the method of reading data from the private data area of the minus-one screen by means of the content provider is as follows:

private Object getValue(String prefName, String key, int type).

In step S614, a Mcontext containing the resource object and the first SharedPreferences interface is created.

It may be understood that when the terminal loads the root layout of the minus-one screen by reflection according to the found class reflection, the context imported to the Launcher desktop will be reflected. However, the context does not belong to the context of the minus-one screen. In the runtime environment corresponding to the context, the minus-one screen cannot run normally. For example, the minus-one screen cannot reference its own resource, and cannot implement the data reading and writing process for the private data area of the minus-one screen. Therefore, in this embodiment, after constructing the resource object and the first SharedPreferences interface, the terminal needs to customize and create the MContext belonging to the minus-one screen. The MContext inherits from the context wrapper and is constructed as follows:

MContext(Context paramContext, ClassLoader paramClassLoader, String paramPath).

The MContext includes the resource object and the first SharedPreferences interface constructed previously by the terminal.

In step S616, the minus-one screen is loaded according to the MContext.

After constructing the MContext of the minus-one screen, the terminal may load the minus-one screen according to the MContext. In this case, because the terminal uses the resource object corresponding to the minus-one screen to replace the resource object in an original context of the desktop container, when the minus-one screen uses a get-Resource function to reference the resources, the minus-one screen acquires its own resource, rather than the resource of the desktop container.

On the other hand, because the first SharedPreferences interface is included in the Mcontext of the minus-one screen, inter-process communication between the Launcher desktop container and the minus-one screen can be implemented through be the first SharedPreferences interface, and the Launcher desktop container can transmit the read request for the first target data to the minus-one screen through the first SharedPreferences interface and receive the first target data sent from the minus-one screen. Alternatively, the Launcher desktop container can transmit the write request including the second target data to the minus-one screen through the first SharedPreferences interface.

When sending the read request to the minus-one screen, the SharedPreferences interface may invoke a getValue function. The getValue function includes several types, such as getString (function for reading character string data), getInt (function for reading integer data) and getLong (function for reading long integer data). Accordingly, functions for writing data include several types, such as putString, putInt, and putLong. However, in this embodiment, the first SharedPreferences interface is implemented by the content provider, and the content provider is carried by a Bundle to return the data. Therefore, for the sake of unity of data, when transmitting the first target data through the first SharedPreferences interface, the minus-one screen converts all data types into the String type, and then performs data type conversion on the received first target data after the desktop container receives the first target data.

In this embodiment, since the view of the minus-one screen is in a parent view of the Launcher desktop, when the desktop container needs to notify an event to the minus-one screen, the dispatch key event method of the event distribution mechanism of the view may be used to dispatch the event to the minus-one screen. To prevent the event of the minus-one screen from colliding with the original event of the system, in this embodiment, it can be agreed between the minus-one screen and the Launcher desktop container that the action and the code of the event of the minus-one screen are both negative numbers. Before the dispatch key event distributes the event, the parent view of the Launcher desktop needs to re-encode the event action and the information code of the current event to be distributed: if the event to be distributed belongs to the minus-one screen, ensuring that the action and the code of the event are negative numbers. When the minus-one screen receives the event, the event may be parsed and a corresponding operation is executed according to an analysis result.

According to the method for loading a minus-one screen provided by the embodiment of the present disclosure, after loading the code of the minus-one screen, i.e., the dex file of the minus-one screen to the virtual machine, the Mcontext belonging to the minus-one screen is obtained by the constructing the resource object corresponding to the resource of the minus-one screen and based on the constructed resource object and the constructed first SharedPreferences interface, thus loading the minus-one screen in the runtime environment corresponding to the Mcontext, so that the minus-one screen can normally run in the process of the desktop container under the condition that the code of the minus-one screen is independent from the code of the desktop container, and the minus-one screen is not affected to reference the resource and use the private data area. The method for loading a minus-one screen provided in this embodiment reduces the service logic coupling between the minus-one screen and the desktop container under the condition of guaranteeing basic functions of the minus-one screen, so that versions of the minus-one screen and the desktop container are changed independently, and the cost of multi-level version maintenance is reduced.

Third Embodiment

Figure 7:
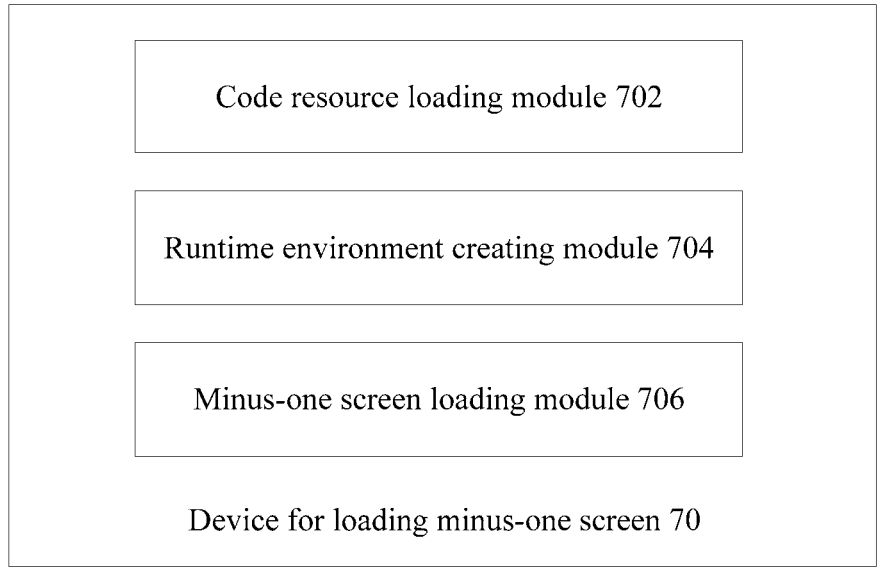
FIG. 7 is a schematic structural diagram of a device for loading a minus-one screen provided by a third embodiment of the present disclosure.

This embodiment provides a device for loading a minus-one screen. Please refer to a schematic structural diagram of the device for loading a minus-one screen illustrated in FIG. 7.

The device for loading a minus-one screen 70 includes a code resource loading module 702, a runtime environment creating module 704 and a minus-one screen loading module 706, wherein the code resource loading module 702 is configured to load a code of a minus-one screen independent from a code of a desktop container to a virtual machine, and is also configured to load a resource of the minus-one screen to the virtual machine. The runtime environment creating module 704 is configured to create a context of the minus-one screen including a resource acquisition path of the resource of the minus-one screen and uses the context of the minus-one screen to replace a context of the desktop container. The minus-one screen loading module 706 is configured to load the minus-one screen according to the context of the minus-one screen.

In this embodiment, the code of the minus-one screen and the code of the desktop container are independent and are not mixed together. The desktop container has its own installation package, and similarly, the minus-one screen also has its own independent installation package. In this embodiment, the minus-one screen needs to be loaded to the desktop container, so that a user may normally enter the minus-one screen by touching on a first screen, and the minus-one screen with the independent code can provide business services to the user just like the minus-one screen in the existing art. Here, the minus-one screen may be regarded as a plugin of the desktop container, and the plug-in minus-one screen will eventually run in the desktop container. Taking a Launcher desktop as an example, a structure of the Launcher desktop is briefly introduced. Please refer to FIG. 2 and FIG. 3.

After the minus-one screen is introduced, the Launcher desktop is divided into the minus-one screen and a common screen. It may be understood that there may be more than one common screen. FIG. 2 illustrates a schematic structural diagram of a common screen 20. The common screen 20 includes a workspace 21, a hotseat 22 and a navigation point 23. The workspace 21 is a component that can slide left and right. In the normal screen 20, the workspace 21 is a container for application icons, and the application icons may be dragged inside the workspace 21. The navigation point 23 is configured to indicate which common screen is currently on. The hotseat 22 is configured to store some commonly used application icons. In the case of two or more common screens, when a user controls the workspace 21 to slide left and right, the hotseat 22 in the common screen 20 will not move along with the movement of the workspace 21.

FIG. 3 illustrates a schematic structural diagram of a minus-one screen 30. The minus-one screen 30 includes a desktop container 31, and a root layout 32 of the minus-one screen. The root layout 32 of the minus-one screen runs in the desktop container 31. Display layout of the minus-one screen 30 is no longer limited by a display layout style of the common screen 20. For example, the minus-one screen 30 can support sliding up and down, and the minus-one screen 30 can present more contents to the user in comparison to display contents of the common screen 20. Moreover, the contents displayed on the minus-one screen 30 are not limited to various application icons. For example, the minus-one screen 30 may access third-party services to implement software revenues.

In order to load the minus-one screen, the code resource loading module 702 needs to load a code in a plugin installation package, i.e., the code of the minus-one screen, to the virtual machine. It may be understood that loading the code of the minus-one screen to the virtual machine by the code resource loading module 702 is actually loading a class file in the code of the minus-one screen to a Java virtual machine. In a compiling system of Android, the class file is further processed, which makes the class file become a dex file. The dex file is an executable file on an Android platform, which is equivalent to an exe file in a Windows platform. Every Apk installation package contains a dex file, which contains all source codes of the installation package. Therefore, loading the code in the plugin installation package by the code resource loading module 702 is essentially loading the dex file in the plugin installation package.

The code resource loading module 702 may adopt a ClassLoader for loading the class, and may adopt a DexClassLoader for loading the dex file. The DexClassLoader is a class inherited from the ClassLoader. Therefore, in this embodiment, the code resource loading module 702 may use the DexClassLoader to load the dex file of the minus-one screen, for example, the code resource loading module 702 loads the dex file from the installation package of the minus-one screen through the DexClassLoader.

After the DexClassLoader loads the dex file of the minus-one screen to the virtual machine, it actually loads the class corresponding to the minus-one screen to the virtual machine. In this case, the code resource loading module 702 may load a root layout of the minus-one screen by a reflection loading manner. The code resource loading module 702 finds a method to load the root layout of the minus-one screen from the loaded class, and then loads the root layout of the minus-one screen according to the method.

After loading the code of the minus-one screen to the virtual machine, the code resource loading module 702 also needs to load the resource of the minus-one screen to the virtual machine. The resource of the minus-one screen includes words, pictures, entries, or the like. In the Android system, a getResource method may be used to acquire a corresponding resource object, and a plurality of parameters required for creating the resource object need to be imported through an asset manager. Therefore, in this embodiment, in order to load the resource of the minus-one screen, the code resource loading module 702 may construct the asset manager first, and then construct the resource object through the asset manager, and then load the resource of the minus-one screen to the virtual machine according to the resource object.

Through the processing of the code resource loading module 702, the code and the resource of the minus-one screen may be loaded to the virtual machine. However, when the DexClassLoader loads the dex file in the installation package Apk of the minus-one screen to a process of the desktop container, the context of the desktop container is imported when the root layout of the minus-one screen is loaded by reflection. Therefore, in this case, the code of the minus-one screen running in the process of the desktop container is actually in a runtime environment of the desktop container. The minus-one screen may only obtain a resource of the desktop container when acquiring resources. The plurality of resources (such as pictures, layouts and entries, etc.) of the minus-one screen itself cannot be found in the resource of the desktop container.

Therefore, in order to ensure that the resource of the minus-one screen itself may be acquired when the minus-one screen is running, in this embodiment, after the code resource loading module 702 loads the resource of the minus-one screen to the virtual machine, the runtime environment creating module 704 also needs to process the context representing the runtime environment of the minus-one screen: the runtime environment creating module 704 creates a context belonging to the minus-one screen, such as an MContext defined by the runtime environment creating module 704. The Mcontext inherits from a context wrapper. As the context of the minus-one screen, the Mcontext includes a resource acquisition path of the resource of the minus-one screen.

After the runtime environment creating module 704 creates the context of the minus-one screen, the minus-one screen may be loaded by the minus-one screen loading module 706 according to the context. It may be understood that loading the minus-one screen by the minus-one screen loading module 706 according to the context of the minus-one screen actually means running the code of the minus-one screen according to the context of the minus-one screen, and referencing the resource of the minus-one screen during a code running process to present the minus-one screen to the user. In other words, the minus-one screen loading module 706 runs the code of the minus-one screen in the runtime environment corresponding to the context of the minus-one screen, and refers the resource of the minus-one screen to provide a minus-one screen service to the user. In this way, the minus-one screen runs in the runtime environment belonging to the minus-one screen, and may acquire its own resource, instead of running in the runtime environment of the desktop container, which can only acquire the resource of the desktop container.

Through the above process, the minus-one screen can be loaded. However, because the minus-one screen and the desktop container belong to different processes, and cannot communicate directly with each other, which makes the desktop container unable to notify the minus-one screen of events such as the user sliding into and sliding out of the minus-one screen. It may be understood that if the minus-one screen knows when the user slides in, the minus-one screen may update contents when the user slides in, so as to provide the latest and most real-time business service to the user. Besides, if the minus-one screen knows when the user slides out, the minus-one screen may release a memory in time and end some specific monitoring, thus avoiding resource occupation and waste. Therefore, if the minus-one screen cannot communicate with the desktop container, the minus-one screen may only update the content and release resources regularly, and cannot provide the user with high-quality business services, which will easily lead to low user experience. Therefore, in order to let the minus-one screen know the events of the user sliding in and sliding out, this embodiment provides a solution as below.

Figure 8:
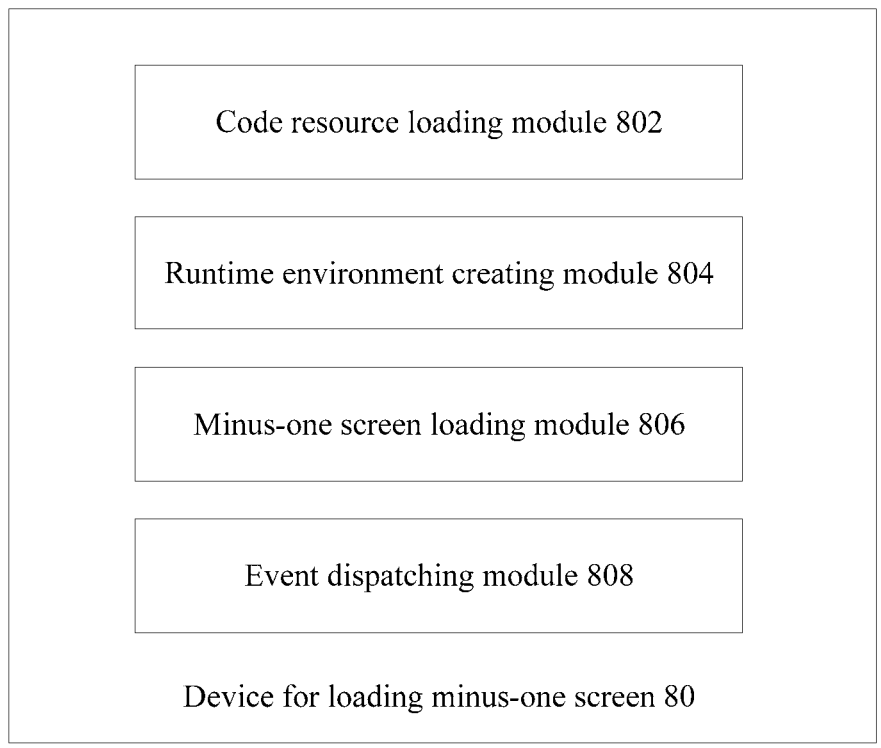
FIG. 8 is another schematic structural diagram of the device for loading a minus-one screen provided by the third embodiment of the present disclosure.

Please refer to FIG. 8, which illustrates a schematic structural diagram of a device for loading a minus-one screen in an example of this embodiment. In this example, in addition to a code resource loading module 802, a runtime environment creating module 804 and a minus-one screen loading module 806, the device for loading a minus-one screen 80 also includes an event distributing module 808. The event distributing module 808 may invoke dispatch key event in an event distribution mechanism of a view to implement communication between a desktop container and a minus-one screen. When the desktop container monitors an event for the minus-one screen, the event distributing module 808 may invoke the dispatch key event to distribute the event to the minus-one screen. It may be understood that the dispatch key event is not only configured to distribute events to the minus-one screen, but also to distribute events belonging to a common screen (also called events of system) to the desktop container. Therefore, when the dispatch key event distributes an event, it is necessary to distinguish whether the event to be distributed currently belongs to the common screen or belongs to the minus-one screen.

In this embodiment, the event distributing module 808 may distinguish whether the current event to be distributed belongs to the minus-one screen or the system through event attribute information. The event attribute information includes an action and a code. The action includes a key press event, a key pop-up event and the like. The code is configured to indicate which key the event is for. In order to distinguish the event of the minus-one screen from the event of the system, a parent view in the desktop container ensures that the event attribute information of the two is different before distributing the event. In this way, when the event distributing module 808 controls the dispatch key event to distribute the event, the dispatch key event can determine whether the current event belongs to the minus-one screen according to the event attribute information. It may be understood that as long as one of the event attribute information of the event of the minus-one screen is different from the event attribute information of the event of the system, the purpose of distinguishing can be achieved. In some examples of this embodiment, the action and the code of the event of the minus-one screen may be made different from actions and codes of a plurality of events of the system.

Since the event action and the information code of the event of the system are usually positive or non-negative numbers, in some examples of this embodiment, in order to make it easy to distinguish, at least one information in the event attribute information of the event of the minus-one screen may be set as a negative number. Therefore, when the dispatch key event determines that the event attribute information of the event to be distributed currently includes a negative number, it can be directly determined that the event is the event of the minus-one screen. For instance, in an example of this embodiment, the action and the code of the event of the minus-one screen are both negative numbers, while the action and the code of the event of the system are both positive numbers.

In this embodiment, the code of the minus-one screen runs in the process of the desktop container, so it is impossible to read and write data directly from a private data area of the minus-one screen. In some related solutions, for this case, an AIDL and a service are used to complete inter-process communication, but these solutions have the following defects.

1) During the running of the minus-one screen, it is necessary to continuously keep the service alive. In other words, when the minus-one screen needs to read and write data with the help of the service, it is necessary to determine whether the service is in a running status first, and if it is determined that the service is in the running status, the data may be read normally; otherwise, the service has to be started before data reading and writing. That is to say, this data reading and writing demand cannot be responded normally.

2) When loading the root layout of the minus-one screen, data stored in the private data area of the minus-one screen may be needed. If the service is not started when loading the root layout of the minus-one screen, the minus-one screen cannot be loaded. In this case, the loading process of the minus-one screen will be interrupted, which will lead to a longer loading time of the minus-one screen.

3) Because the solution of reading and writing the data from the private data area of the minus-one screen is based on the service and the AIDL, when there is a data reading and writing demand, it is necessary to extend a corresponding interface for the AIDL, and this interface also needs to be implemented for the service. In this way, if a third-party aar (Android Archive) package wants to read data, it also needs to provide an interface for the aar package by callback, which will make a complicated logic and a high coupling degree.

Figure 9:
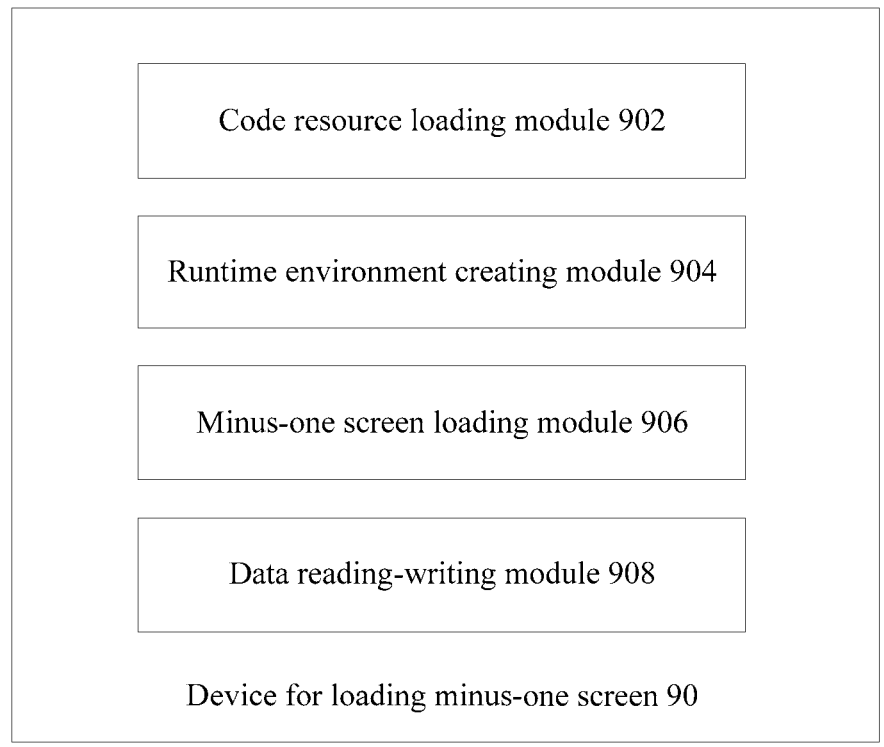
FIG. 9 is another schematic structural diagram of the device for loading a minus-one screen provided by the third embodiment of the present disclosure.

In order to avoid the plurality of problems above, this embodiment also provides a device for loading a minus-one screen. Please refer to FIG. 9.

The device for loading a minus-one screen 90 includes a code resource loading module 902, a runtime environment creating module 904 and a minus-one screen loading module 906. Moreover, the device for loading a minus-one screen 90 further includes a data reading-writing module 908. The data reading-writing module 908 uses a content provider to wrap and form a first SharedPreferences interface, and uses the first SharedPreferences interface to replace a SharedPreferences interface in a context (i.e., a context of a desktop container) imported by reflection when loading a root layout of a minus-one screen. In other words, a context of the minus-one screen Mcontext may also include the first SharedPreferences interface. For the minus-one screen, the minus-one screen may have two SharedPreferences interfaces, one of which is the first SharedPreferences interface wrapped by the content provider, and the other is a real SharedPreferences interface, which is called a second SharedPreferences interface here. After the loading of the minus-one screen is completed, data reading and writing in a private data area of the minus-one screen may be implemented by the data reading-writing module 908 through the first SharedPreferences interface and the second SharedPreferences interface of the minus-one screen.

When the desktop container has a requirement to read data from the private data area of the minus-one screen, the data reading-writing module 908 may control the desktop container to send a read request for first target data to the minus-one screen through the first SharedPreferences interface. It may be understood that the read request may include information configured to indicate the first target data to be read. After the minus-one screen receives the read request from the desktop container through the first SharedPreferences interface, the data reading-writing module 908 may control the minus-one screen to use the second SharedPreferences interface to read the first target data from the private data area according to the read request. After the second SharedPreferences interface reads the first target data from the private data area of the minus-one screen, the data reading-writing module 908 may send the read first target data to the desktop container through the first SharedPreferences interface.

When the desktop container needs to write second target data to the private data area of the minus-one screen, the data reading-writing module 908 may control the desktop container to send a write request to the minus-one screen through the first SharedPreferences interface, and the write request at least includes the second target data to be written. After the minus-one screen receives the write request sent from the desktop container through the first SharedPreferences interface, the data reading-writing module 908 may parse the write request to obtain the second target data, and then controls the minus-one screen to write the second target data to the private data area through the second SharedPreferences interface.

It can be known from the above introduction that, the first SharedPreferences interface is equivalent to a bridge of communication between the desktop container and the minus-one screen, while the second SharedPreferences interface mainly implements communication between the minus-one screen and the private data area. For a third party, the third party may directly call the first SharedPreferences interface to read and write the data in the private data area of the minus-one screen, and may not perceive that there is inter-process communication between the desktop container and the minus-one screen;

therefore, coupling with the third party is decreased.

In this embodiment, the device for loading a minus-one screen may be deployed on a terminal, such as a mobile phone with an Android system, a tablet computer, a smart wearable device, and the like. It may be understood that the device for loading a minus-one screen may include the event distributing module and the data reading-writing module. Functions of the code resource loading module, the runtime environment creating module, the minus-one screen loading module, the event distributing module and the data reading-writing module may all be implemented by a processor of the terminal.

In the device for loading a minus-one screen provided in this embodiment, under the condition of separating the code of the minus-one screen from the code of the desktop container, the code of the minus-one screen and the resource of the minus-one screen are loaded to the virtual machine to create the context of the minus-one screen pointing to the resource of the minus-one screen, and replace the context of the desktop container with the context of the minus-one screen, so that the minus-one screen can run in its own runtime environment and refer its own resource. Therefore, in the case of reducing the coupling between the minus-one screen and the desktop container, the loading of the minus-one screen in the process of the desktop container is implemented. Furthermore, through the dispatch key event in the event distribution mechanism of the view, the minus-one screen may be notified of events such as the user sliding into and sliding out of the minus-one screen, so that the minus-one screen can provide better services to the user. Besides, through mutual cooperation between the first SharedPreferences interface and the second SharedPreferences interface, the third party can read and write the data to the private data area of the minus-one screen without perceiving the inter-process communication, thus avoiding a plurality of problems caused by reading and writing the data with the aid of the AIDL and the service.

In addition, because the code of the minus-one screen is independent from the code of the desktop container, a default permission required by the minus-one screen will no longer belong to a default permission required by the desktop container, which makes it easier for the minus-one screen to pass a test of Google when the minus-one screen requires the default permission.

Fourth Embodiment

This embodiment provides a computer readable storage medium and a terminal. The storage medium is explained first.

One or more computer programs that can be read, compiled and executed by one or more processors may be stored in the computer readable storage medium. In this embodiment, a minus-one screen loading program may be stored in the computer readable storage medium, and the minus-one screen loading program may be used by the one or more processors to perform the steps of implementing the method for loading a minus-one screen introduced in any one of the first embodiment or the second embodiment mentioned above.

Figure 10:
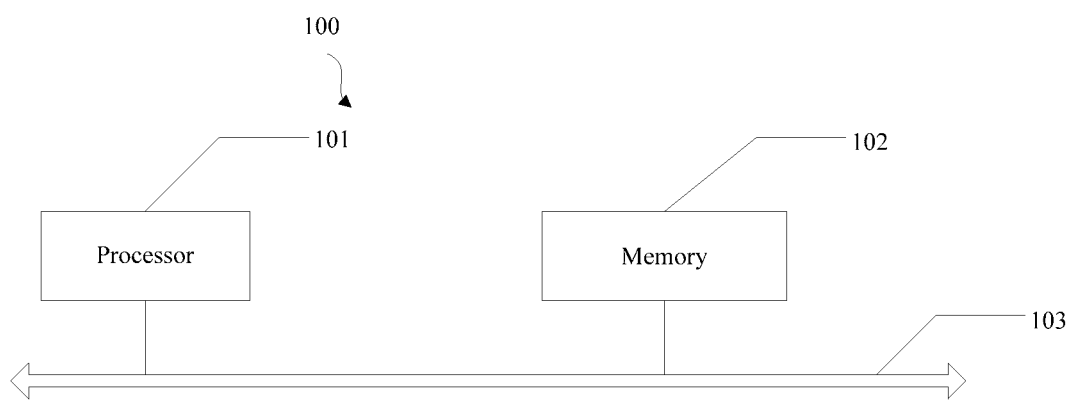
FIG. 10 is a schematic structural diagram of a terminal provided by a fourth embodiment of the present disclosure.

This embodiment also provides a terminal. Please refer to a schematic structural diagram of the terminal shown in FIG. 10.

The terminal 100 includes a processor 101, a memory 102, and a communication bus 103 for connecting the processor 101 and the memory 102, wherein the memory 102 may be the aforementioned storage medium storing the minus-one screen loading program. The processor 101 may read and compile the minus-one screen loading program stored in the memory 102, and execute the steps of the method for loading a minus-one screen introduced in any one of the first embodiment or the second embodiment mentioned above.

The processor 101 loads a code of a minus-one screen and a resource of the minus-one screen to a virtual machine, the code of the minus-one screen being independent from a code of a desktop container; then the processor 101 creates a context of the minus-one screen including a resource acquisition path of the resource of the minus-one screen and replaces a context of the desktop container, and loads the minus-one screen according to the context of the minus-one screen.

In an example of this embodiment, the context of the minus-one screen further includes a first SharedPreferences interface. The first SharedPreferences interface is formed by a content provider through wrapping. After the minus-one screen is loaded according to the context of the minus-one screen, the processor 101 will also carry out data reading and writing in a private data area of the minus-one screen through the first SharedPreferences interface and the second SharedPreferences interface of the minus-one screen.

In an example of this embodiment, after loading the minus-one screen according to the context of the minus-one screen, the processor 101 will also invoke a dispatch key event in an event distribution mechanism of a user interface (view) to distribute an event to the minus-one screen. At least one different information exists between event attribute information of the event of the minus-one screen and event attribute information of a plurality of original events of a system, and the event attribute information includes event action information and information code information.

Details of the terminal 100 implementing the method for loading a minus-one screen in the first embodiment 1 or the second embodiment can be referred to the introduction of the forgoing embodiments, and will not be elaborated herein.

Figure 11:
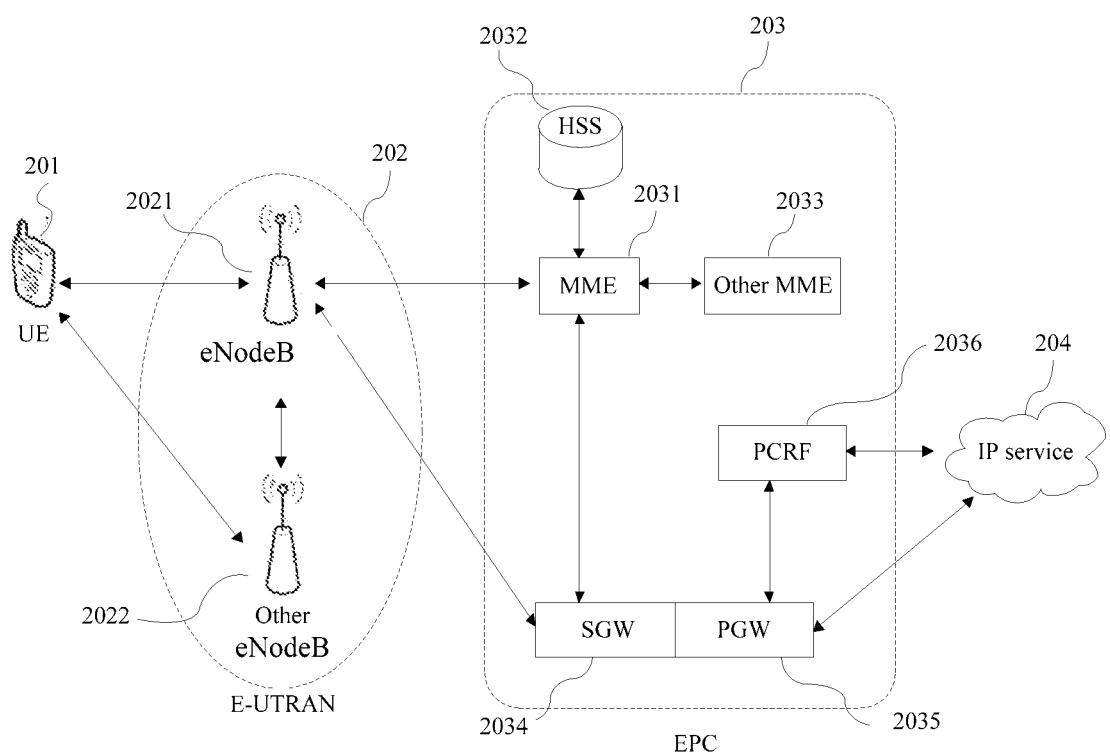
FIG. 11 is a system architecture diagram of a communication network system in which the terminal in FIG. 10 is located.

Here, a communication network system in which the terminal 100 is located will be briefly introduced with reference to an architecture diagram of a communication network system in which the terminal 100 is located shown in FIG. 11. The communication network system is an LTE system of a universal mobile communication technology. The LTE system includes a User Equipment (UE) 201, an Evolved UMTS Terrestrial Radio Access Network (E-UTRAN) 202, an Evolved Packet Core (EPC) 203, and an Internet Protocol (IP) service 204 of an operator which are sequentially connected in communication.

Exemplarily, the UE 201 may be the above-mentioned terminal 100, which will not be elaborated herein.

The E-UTRAN 202 includes an Evolved Node B (eNodeB) 2021 and other eNodeB 2022. The eNodeB 2021 can be connected with other eNodeB 2022 through a backhaul (e.g., X2 interface). The eNodeB 2021 is connected to the EPC 203, and the eNodeB 2021 can provide access for the UE 201 to the EPC 203.

The EPC 203 may include a mobility management entity (MME) 2031, a home subscriber server (HSS) 2032, other MME 2033, a serving gate way (SGW) 2034, a PDN gate way (PGW) 2035, a policy and charging rules function (PCRF) 2036, or the like. The MME 2031 is a control node that handles signaling between the UE 201 and the EPC 203, and provides hosting and connecting management. The HSS 2032 is configured to provide some registers to manage functions such as a home location register (not shown in the figure), and store some user-specific information about service features and data rates. All user data can be sent through the SGW 2034. The PGW 2035 can provide IP address allocation of the UE 201 and other functions. The PCRF 2036 is a policy and charging control policy decision point of service dataflow and IP host resources, which selects and provides available policies and charging control decisions for a policy and charging execution function unit (not shown in the figure).

The IP service 204 may include Internet, Intranet, IP Multimedia Subsystem (IMS) or other IP services.

Although the LTE system has been introduced as an example, those skilled in the art should know that the present disclosure is not only applicable to the LTE system, but also applicable to other wireless communication systems, such as a GSM, a CDMA2000, a WCDMA, a TD-SCDMA, and new network systems in the future.

In this embodiment, the terminal first loads the code of the minus-one screen and the resource of the minus-one screen to the virtual machine, then creates the context of the minus-one screen to replace the context of the desktop container, and loads the minus-one screen according to the according to the context of the minus-one screen. Because the context of the minus-one screen includes the resource acquisition path of the resource of the minus-one screen, when the virtual machine runs the code of the minus-one screen, the resource corresponding to the minus-one screen can be acquired, thus, in the case that the code of the minus-one screen is independent from the code of the desktop container, the effect of displaying the minus-one screen in the desktop container is implemented and the loading of the minus-one screen is completed. On the basis of ensuring the normal loading of the minus-one screen, a coupling degree between a service logic of the minus-one screen and a service logic of the desktop container is reduced, and the version maintenance cost of the minus-one screen and the desktop container is reduced, and a version maintenance cost of the minus-one screen and the desktop container is reduced, which is beneficial to respective version alternations of the minus-one screen and the desktop container.

According to the method and the device for loading a minus-one screen, the terminal and the computer readable storage medium provided by the embodiments of the present disclosure, the code of the minus-one screen and the code of the desktop container originally mixed together are separated, so that the minus-one screen and the desktop container are independent from each other. When loading the minus-one screen, the terminal first loads the code of the minus-one screen and the resource of the minus-one screen to the virtual machine, then creates the context of the minus-one screen to replace the context of the desktop container, and loads the minus-one screen according to the according to the context of the minus-one screen. Because the context of the minus-one screen includes the resource acquisition path of the resource of the minus-one screen, when the virtual machine runs the code of the minus-one screen, the resource corresponding to the minus-one screen can be acquired, thus, in the case that the code of the minus-one screen is independent from the code of the desktop container, the effect of displaying the minus-one screen in the desktop container is implemented and the loading of the minus-one screen completed. On the basis of ensuring the normal loading of the minus-one screen, a coupling degree between a service logic of the minus-one screen and a service logic of the desktop container is reduced, and the version maintenance cost of the minus-one screen and the desktop container is reduced, and a version maintenance cost of the minus-one screen and the desktop container is reduced, which is beneficial to respective version alternations of the minus-one screen and the desktop container.

In addition, the minus-one screen requests more default permissions, while a test of Google has great restrictions on default permissions requested by the desktop. Since the service logics of the minus-one screen and the desktop container in this embodiment of the present disclosure are independent, the default permissions requested by the minus-one screen can have nothing to do with the desktop, and the acquisition of the default permissions is not limited by the test of Google, so that desired default permissions can be easily acquired. It should be understood by those skilled in the art that all or some of the specific steps in the method, and the functional modules/units in the system and device disclosed above may be implemented as software (which may be implemented by program codes executable by a computing device), firmware, hardware and appropriate combinations thereof. In a hardware implementation manner, the division between the functional modules/units mentioned in the above description does not necessarily correspond to the division of physical components; for example, one physical component may have multiple functions, or one function or step may be performed cooperatively by several physical components. Some or all of the physical components may be implemented as software executed by a processor, such as a central processing unit, a digital signal processor or a microprocessor, or implemented as hardware, or implemented as an integrated circuit, such as an application specific integrated circuit. Such software may be distributed on a computer readable medium and executed by the computing device. In some specific cases, the steps shown or described may be performed in a different order from the order here. The computer readable medium may include a computer storage medium (or non-transitory medium) and a communication medium (or transient medium). As well known to those of ordinary skills in the art, the term computer storage medium includes volatile and non-volatile, removable and non-removable medium implemented in any method or art for storing information (such as computer readable instruction, data structure, programming module or other data). The computer storage medium includes a Random Access Memory (RAM), a Read-Only Memory (ROM), an Electrically Erasable Programmable Read Only Memory (EEPROM), a flash memory or other memory technology, a compact disk ROM (CD-ROM), a digital video disk (DVD) or other optical disk storage, magnetic box, magnetic tape, magnetic disk storage or other magnetic storage devices, or any other medium that can be configured to store desired information and may be accessed by a computer. Moreover, it is well known to those of ordinary skills in the art that the communication medium typically includes computer readable instructions, data structures, programming modules, or other data in a modulated data signal, such as a carrier wave or other transmission mechanism, and may include any information delivery medium. Thus, the present disclosure is not limited to any particular combination of hardware and software.

What is claimed is:
1. A method for loading a minus-one screen, comprising:
loading a code of the minus-one screen and a resource of the minus-one screen to a virtual machine respectively, the code of the minus-one screen being independent from a code of a desktop container;
creating a context of the minus-one screen and replacing a context of the desktop container, the context of the minus-one screen comprising a resource acquisition path of the resource of the minus-one screen; and
loading the minus-one screen according to the context of the minus-one screen.

2. The method for loading a minus-one screen according to claim 1, wherein the loading a code of the minus-one screen to the virtual machine comprises:
   loading an executable dex file of the minus-one screen by using a DexClassLoader; and
   loading a root layout of the minus-one screen by reflection.

3. The method for loading a minus-one screen according to claim 1, wherein the loading a resource of the minus-one screen to the virtual machine comprises:
   constructing an asset manager;
   constructing a resource object through the asset manager; and
   loading the resource of the minus-one screen to the virtual machine according to the resource object.

4. The method for loading a minus-one screen according to claim 1, wherein after the loading the minus-one screen according to the context of the minus-one screen, the method further comprises:
   invoking a dispatch key event in an event distribution mechanism of a user interface, also called as a view, to distribute an event to the minus-one screen, at least one different information existing between event attribute information of the event of the minus-one screen and event attribute information of a plurality of original events of a system, and the event attribute information comprising event action information and information code information.

5. The method for loading a minus-one screen according to claim 4, wherein the event attribute information of the event of the minus-one screen is a negative number, and the event attribute information of the plurality of original events of the system is a non-negative number.

6. The method for loading a minus-one screen according to claim 1, wherein the context of the minus-one screen further comprises a first SharedPreferences interface, and the first SharedPreferences interface is formed by a content provider through wrapping; and
   after the loading the minus-one screen according to the context of the minus-one screen, the method further comprises:
   reading and writing data in a private data area of the minus-one screen through the first SharedPreferences interface and a second SharedPreferences interface of the minus-one screen.

7. The method for loading a minus-one screen according to claim 6, wherein the reading and writing the data in the private data area of the minus-one screen through the first SharedPreferences interface and the second SharedPreferences interface of the minus-one screen comprises a data reading process and a data writing process;
   wherein, the data reading process comprises:
   receiving a read request for first target data sent from the desktop container through the first SharedPreferences interface;
   reading the first target data from the private data area according to the read request through the second SharedPreferences interface; and
   sending the first target data read through the second SharedPreferences interface to the desktop container through the first SharedPreferences interface; and
   the data writing process comprises:
   receiving a write request sent from the desktop container through the first SharedPreferences interface, the write request carrying second target data to be stored; and
   controlling the second SharedPreferences interface to write the second target data to the private data area.

8. The method for loading a minus-one screen according to claim 2, wherein after the loading the minus-one screen according to the context of the minus-one screen, the method further comprises:
   invoking a dispatch key event in an event distribution mechanism of a user interface, also called as a view, to distribute an event to the minus-one screen, at least one different information existing between event attribute information of the event of the minus-one screen and event attribute information of a plurality of original events of a system, and the event attribute information comprising event action information and information code information.

9. The method for loading a minus-one screen according to claim 3, wherein after the loading the minus-one screen according to the context of the minus-one screen, the method further comprises:
   invoking a dispatch key event in an event distribution mechanism of a user interface, also called as a view, to distribute an event to the minus-one screen, at least one different information existing between event attribute information of the event of the minus-one screen and event attribute information of a plurality of original events of a system, and the event attribute information comprising event action information and information code information.

10. The method for loading a minus-one screen according to claim 2, wherein the context of the minus-one screen further comprises a first SharedPreferences interface, and the first SharedPreferences interface is formed by a content provider through wrapping; and
    after the loading the minus-one screen according to the context of the minus-one screen, the method further comprises:
    reading and writing data in a private data area of the minus-one screen through the first SharedPreferences interface and a second SharedPreferences interface of the minus-one screen.

11. The method for loading a minus-one screen according to claim 3, wherein the context of the minus-one screen further comprises a first SharedPreferences interface, and the first SharedPreferences interface is formed by a content provider through wrapping; and
    after the loading the minus-one screen according to the context of the minus-one screen, the method further comprises:
    reading and writing data in a private data area of the minus-one screen through the first SharedPreferences interface and a second SharedPreferences interface of the minus-one screen.

12. A terminal, comprising a processor, a memory, and a communication bus; wherein,
    the communication bus is configured to realize connection communication between the processor and the memory; and
    the processor is configured to execute a program stored in the memory to implement a method for loading a minus-one screen, the method comprising:
    loading a code of the minus-one screen and a resource of the minus-one screen to a virtual machine respectively, the code of the minus-one screen being independent from a code of a desktop container;
    creating a context of the minus-one screen and replacing a context of the desktop container, the context of the minus-one screen comprising a resource acquisition path of the resource of the minus-one screen; and loading the minus-one screen according to the context of the minus-one screen.

13. A non-transitory computer readable medium, wherein the computer readable storage medium stores a program, and the program is executable by a processor to implement a method for loading a minus-one screen, the method comprising:

loading a code of the minus-one screen and a resource of the minus-one screen to a virtual machine respectively, the code of the minus-one screen being independent from a code of a desktop container;

creating a context of the minus-one screen and replacing a context of the desktop container, the context of the minus-one screen comprising a resource acquisition path of the resource of the minus-one screen; and loading the minus-one screen according to the context of the minus-one screen.

* * * * *